F. N. ROSENSTENGEL.
SHOCK ABSORBER FOR VEHICLES.
APPLICATION FILED MAR. 3, 1909.
931,653.
Patented Aug. 17, 1909.
2 SHEETS—SHEET 2.
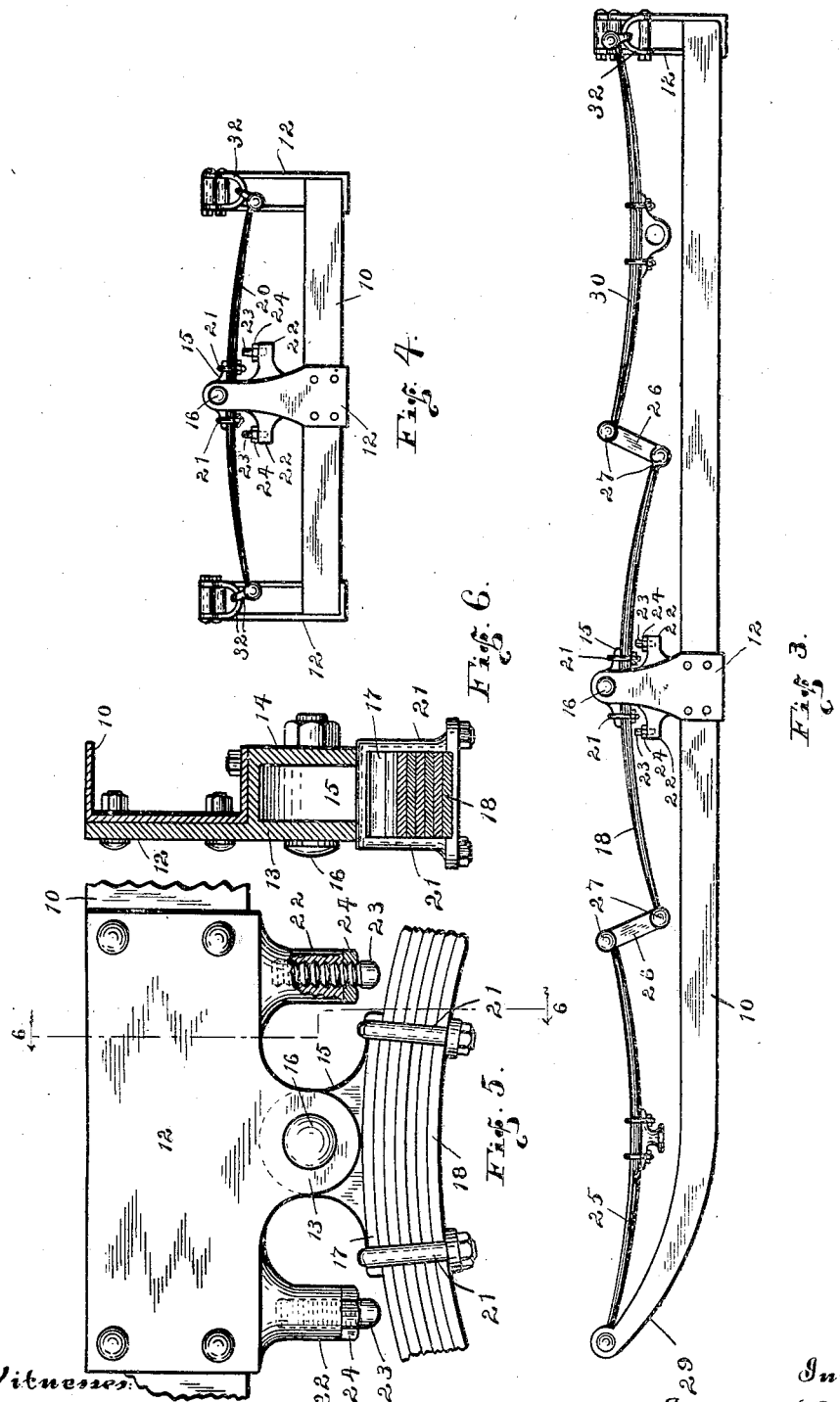
Witnesses:
Adelaide Kearns.
Lee R. Garber
Inventor
Frederick N. Rosenstengel,
By James A. Walsh,
Attorney.

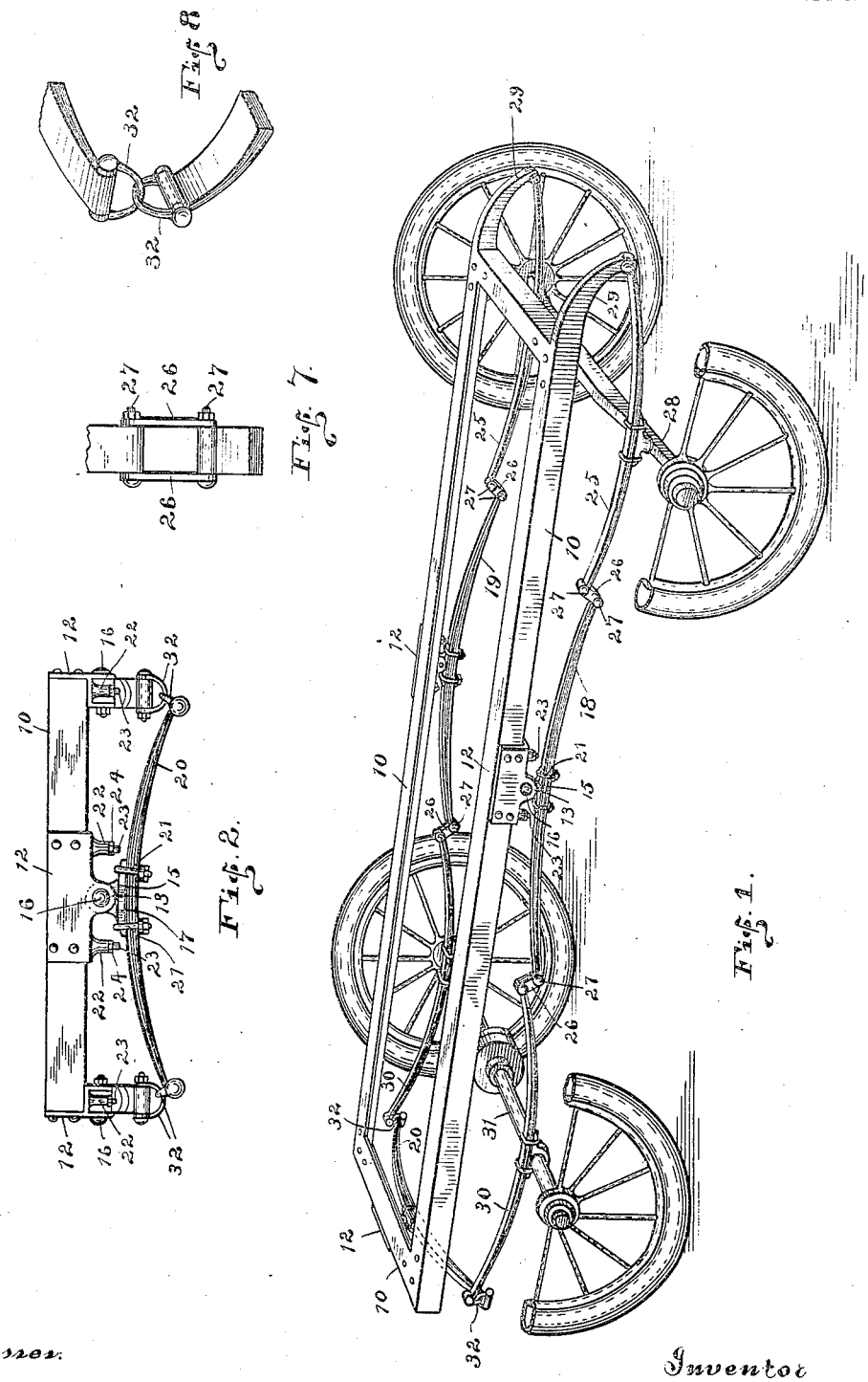

UNITED STATES PATENT OFFICE.

FREDERICK N. ROSENSTENGEL, OF INDIANAPOLIS, INDIANA, ASSIGNOR OF ONE-HALF TO FERDINAND R. STRICKLER, OF FRANKLIN, INDIANA.

SHOCK-ABSORBER FOR VEHICLES.

No. 931,653.　　　Specification of Letters Patent.　　Patented Aug. 17, 1909.

Application filed March 3, 1909. Serial No. 481,120.

*To all whom it may concern:*

Be it known that I, FREDERICK N. ROSENSTENGEL, a citizen of the United States, residing at Indianapolis, in the county of Marion and State of Indiana, have invented certain new and useful Improvements in Shock-Absorbers for Vehicles, of which the following is a specification.

The object of my invention is to provide improved adjustable means for relieving a vehicle from excessive jar and vibration and so arranged that the shock thereto will be absorbed and distributed equally between the axles and frame of the vehicle, all as will be hereinafter more particularly described and claimed.

The accompanying drawings illustrate my invention.

Figure 1 is a perspective view of the frame and running gear of a motor car embodying my invention; Fig. 2, a rear elevation of said frame; Fig. 3, a side elevation of my invention applied to an underhung frame; Fig. 4, a rear elevation of the arrangement indicated in Fig. 3; Fig. 5, a side elevation of the hanger; Fig. 6, a sectional view of said hanger on the dotted line 6—6 in Fig. 5; and Figs. 7 and 8, detail views of spring connections which I employ.

In said drawings the portions marked 10 represent the frame or chassis, comprising parallel side and end members, as usual. To the side and rear frame members, respectively, I attach a bracket, 12, comprising members, 13, 14, which support a hanger, 15, pivotally mounted therebetween by a bolt, 16, the lower end of said hanger being provided with a plate, 17, to which an equalizing spring, as 18, 19, 20, is secured by bolts, 21. At the end of said bracket I also provide an adjustable buffer comprising an interiorly screw-threaded socket member, 22, in which screw-threaded studs, 23, are seated, and held in fixed position by a lock-nut, 24.

To the forward ends of the equalizers 18 and 19 I pivotally secure springs, 25, by means of links, 26, connected to the ends of said equalizers and springs, respectively, by bolts or pins, 27, as indicated in Fig. 7, said springs 25 being also secured to the forward axle, 28, in any suitable manner, and their forward ends pivotally connected to the downwardly deflected forward ends, 29, of the side frame members. I also provide rear side springs, 30, secured to the rear axle, 31, and pivotally connected to said equalizers, 18, 19, in a manner similar to the pivotal connection just described in relation to spring 25, and adjustably connect said springs 30 to the ends of a rear equalizer, 20, when such is employed, preferably by means of clips, 32, in the manner indicated in Fig. 8. It will thus be seen that I provide in a simple manner a series of communicating springs upon which the frame is mounted, and so arranged that any jar or excessive vibration imparted to any one of the wheels when affecting the axle will be transferred therefrom to its immediately connected spring, and from thence to all of the equalizers and springs, so that by such distribution of the jar or vibration the same is gradually absorbed by the springs and not imparted through the frame to the vehicle body.

By means of the adjustable buffers hereinbefore described the spring force of the equalizers may be regulated as desired by lowering and raising the studs 23 and securing them in fixed position by the lock-nuts 24, the lowering of said studs, as will be readily understood, limiting the upward movement of the equalizer, and the raising thereof permitting greater action of said equalizer.

In that type of car where a substantially flat spring is employed on each side of the frame, running from the front to the rear end thereof (and not associated with a rear transverse spring), and having short bowed springs pivotally connected at its ends, and at their inner ends pivotally connected to clips dependent from said main spring, the equalizer which I employ may be readily attached to the middle of said main spring and pivotally connected to the inner ends of said short spring, in which manner I attain the results hereinbefore referred to.

While I have particularly described my invention in connection with a motor car frame designed to be supported thereon, as indicated in Fig. 1, it will be understood that it is as readily applicable to what is known as an "underhung" frame, which contemplates the suspension of the frame from springs, as indicated in Fig. 3.

By pivotally connecting the side springs in the manner indicated, which permits the shortening or lengthening of the set, I am enabled to apply the same to cars of varying lengths, and this is of great advantage, as I provide a set of springs of a single marketable size with which any ordinary motor car or similar vehicle, either before or while in use, may be readily equipped; and where a car is already provided with springs similar to the front and rear side springs the equalizers which I employ may be quickly attached to the frame and such springs pivotally connected thereto in the manner substantially as hereinbefore indicated.

Although I have chosen to illustrate and specifically describe an equalizer comprising a spring, I do not desire to be understood as limiting myself to such exact arrangement, for, as will be readily understood, a bar may be substituted for the semi-elliptical spring, to the ends of which bar the front and rear side spring may be pivotally attached, and similar results obtained through the bar, which, being pivotally mounted in the hanger, may rock upwardly and downwardly, its movement being controlled by the buffers in the same manner as the spring referred to.

I claim as my invention:

The combination, with a vehicle frame, of a shock absorber comprising a spring, adjustable buffers interposed between said spring and said vehicle frame for controlling the movement of said spring, and means for varying the length of said buffers and positively maintaining the same when adjusted in fixed relation to said spring.

In testimony whereof I affix my signature in presence of two witnesses.

FREDERICK N. ROSENSTENGEL.

Witnesses:
LEE R. GARBER,
WALTER J. TINGLE.